US007692637B2

(12) United States Patent
Davis (10) Patent No.: US 7,692,637 B2
(45) Date of Patent: Apr. 6, 2010

(54) USER INPUT DEVICE FOR ELECTRONIC DEVICE

(75) Inventor: Scott Davis, North Vancouver (CA)

(73) Assignee: Nokia Corporation, Espoo (FI)

( * ) Notice: Subject to any disclaimer, the term of this patent is extended or adjusted under 35 U.S.C. 154(b) by 1347 days.

(21) Appl. No.: 11/115,957

(22) Filed: Apr. 26, 2005

(65) Prior Publication Data

US 2006/0238495 A1 Oct. 26, 2006

(51) Int. Cl.
*G06F 3/41* (2006.01)
(52) U.S. Cl. .................................. 345/173; 345/178
(58) Field of Classification Search ............... 345/156, 345/157, 902, 184, 473, 168–173, 178, 764; 715/863, 773, 764, 835; 701/1, 211; 455/415; 704/258, 260; 382/313–319; 358/473–485; 341/34

See application file for complete search history.

(56) References Cited

U.S. PATENT DOCUMENTS

| 5,404,458 | A | * | 4/1995 | Zetts | 710/73 |
| 5,508,719 | A | * | 4/1996 | Gervais | 345/157 |
| 5,706,026 | A | * | 1/1998 | Kent et al. | 345/156 |
| 6,321,098 | B1 | * | 11/2001 | Beith et al. | 455/564 |
| 6,509,847 | B1 | * | 1/2003 | Anderson | 341/34 |
| 6,630,928 | B1 | * | 10/2003 | McIntyre et al. | 345/173 |
| 6,819,312 | B2 | * | 11/2004 | Fish | 345/156 |
| 6,903,723 | B1 | * | 6/2005 | Forest | 345/157 |
| 6,988,071 | B1 | * | 1/2006 | Gazdzinski | 704/275 |
| 7,109,975 | B2 | * | 9/2006 | Fedorak et al. | 345/173 |
| 7,286,112 | B2 | * | 10/2007 | Kinjo | 345/156 |
| 7,301,532 | B1 | * | 11/2007 | Dobry | 345/172 |
| 2002/0135563 | A1 | * | 9/2002 | Canakapalli | 345/163 |
| 2003/0023353 | A1 | * | 1/2003 | Badarneh | 701/1 |
| 2003/0210233 | A1 | * | 11/2003 | Frulla | 345/168 |
| 2004/0046795 | A1 | * | 3/2004 | Josephson et al. | 345/764 |
| 2004/0104894 | A1 | * | 6/2004 | Tsukada et al. | 345/168 |
| 2004/0263483 | A1 | * | 12/2004 | Aufderheide | 345/173 |
| 2005/0134578 | A1 | * | 6/2005 | Chambers et al. | 345/184 |
| 2005/0162402 | A1 | * | 7/2005 | Watanachote | 345/173 |
| 2005/0278754 | A1 | * | 12/2005 | Bleacher et al. | 725/77 |
| 2006/0250377 | A1 | * | 11/2006 | Zadesky et al. | 345/173 |
| 2007/0067104 | A1 | * | 3/2007 | Mays | 701/211 |
| 2008/0016467 | A1 | * | 1/2008 | Chambers et al. | 715/835 |
| 2008/0016468 | A1 | * | 1/2008 | Chambers et al. | 715/835 |
| 2008/0042989 | A1 | * | 2/2008 | Westerman et al. | 345/173 |
| 2008/0238879 | A1 | * | 10/2008 | Jaeger et al. | 345/173 |

* cited by examiner

*Primary Examiner*—Prabodh M Dharia (57) ABSTRACT

A user input device for controlling the movement of a cursor in a graphical user interface (GUI) includes a touch sensitive surface arranged to provide a pre-defined number of touch sensitive surface areas substantially continuous with one another each of which is associated with a corresponding pre-defined functionality. Touching contact with the given surface area causes the cursor to move in the corresponding direction or to stop. The speed of the cursor is controlled by the touching contact which may be a sliding, tapping, pressure or other suitable contact.

42 Claims, 4 Drawing Sheets

USER INPUT DEVICE FOR ELECTRONIC DEVICE

TECHNICAL FIELD

The present invention relates generally to electronic devices, particularly portable electronic devices such as cellular mobile telephone devices, and more particularly to user input devices for use with such electronic devices to control on screen elements in a graphical user interface (GUI), such as cursor movement in a display graphic shown on a screen carried on the electronic device.

BACKGROUND OF THE INVENTION

The manipulation of on screen elements in a graphical user interface (GUI) for example, scrolling through a list displayed on the screen of an electronic device is a frequent and critical task associated with the operation and functioning of applications associated with the given electronic device. Such devices include for example mobile devices, gaming devices, computers, navigational systems, appliances, and other devices in which manipulation of on screen elements is required to carry out the function and operation of the electronic device. Accordingly, a user requires an intuitive method to quickly and accurately locate a specific item through the manipulation of the on-screen element in the graphical user interface for the electronic device.

Prior art controls and user input devices for manipulating on screen elements in a graphical user interface generally require frequent and often times awkward movement on the part of the user to manipulate the on screen element. Other prior art user input devices are generally unsatisfactory due to inaccurate targeting and/or sequencing movement through the menu list using confusing interactions. The prior art controls and user input devices also typically constrain the scrolling speed or movement rate of the on screen element. A further disadvantage is the prior art user input devices generally occupy a relatively large amount of space or volume within the electronic device or change the affect that the user input device has on the display depending upon the area over which the on-screen element is manipulated.

Other known user input devices in the prior art allow users to navigate graphical user interfaces and among such devices are touch pads, touch screens, scroll wheels, rotator dials, joy sticks, jog sticks, jog wheels, and other such controls which devices are well known to those skilled in the art. However, these user input devices typically require frequent and awkward movement with the operation of one or more keys to manipulate the on-screen element in the graphical user interface and which movements increase the risk of repetitive strain injury to the user.

Accordingly, it would be desirable to provide a user input device to manipulate on-screen elements in a graphical user interface that provides a reduction in the frequent and awkward movements on the part of a user in manipulating the on-screen elements in a graphical user interface.

It is a goal therefore to provide a user input device to control and manipulate on-screen elements in a graphical user interface with a reduction in the frequent and awkward movement on the part of a user by causing the on-screen elements to move continually without continuous input from a user.

It is a further goal of the present invention to increase the efficiency of such usage by accelerating the movement of the on-screen element based on the time or force applied to the user input device.

SUMMARY OF THE INVENTION

In accordance with a first aspect of the invention, an electronic device including a user input device is presented. The user input device includes a touch sensitive surface arranged to provide a pre-defined desired number of touch sensitive surface areas wherein each of the touch sensitive areas are associated with a corresponding pre-defined functionality. Appropriate control circuitry is responsive to touching contact with the touch sensitive surface for controlling the movement of a cursor in a display graphic such as a graphical user interface (GUI) shown on a screen carried by the electronic device. In a first pre-defined functionality a touching contact with a first pre-defined surface area causes the cursor to move in a corresponding first direction. In a second pre-defined functionality a touching contact with a second pre-defined surface area causes the cursor to move in a corresponding second direction, and in a third pre-defined functionality a touching contact with a third pre-defined surface area causes the cursor to stop movement. The first, second and third pre-defined surface areas are further arranged such that the first pre-defined surface area is juxtaposed and substantially continuous with the third pre-defined surface area and the third pre-defined surface area is juxtaposed and substantially continuous with the second pre-defined surface area. The touching contact may be a sliding motion touching contact in a first direction with the first pre-defined surface area for accelerating the cursor movement in the corresponding first direction. The sliding motion touching contact may be in a second direction opposite the first direction with the first pre-defined surface area for slowing the cursor movement in the corresponding first direction. The sliding motion touching contact may be in a first direction with the second pre-defined surface area for accelerating the cursor movement in the corresponding second direction. The sliding motion touching contact may be in a second direction with the second pre-defined surface area for slowing the cursor movement in the corresponding second direction. The direction of the cursor movement in the corresponding first direction is opposite to the cursor movement in the corresponding second direction.

The touching contact may be a tapping touching contact for moving the cursor a first pre-defined desired distance in the corresponding first direction in response to a tapping touching contact with the first pre-defined surface area and a second pre-defined desired distance in the corresponding second direction in response to a tapping touching contact with the second pre-defined surface area. Alternately, the cursor moves the respective first and second pre-defined desired distance each time the tapping touching contact is made with the respective first pre-defined surface area and the second pre-defined surface area.

The touching contact may further be a continued pressing touching contact against the touch sensitive surface and the cursor moves until the continued pressing touching contact is removed from the touch sensitive surface.

The touching contact with the third pre-defined surface area may activate a corresponding operation identified at a given cursor location in the display graphic wherein the electronic device is portable and pocket sized and for handheld usage such as a mobile cellular telephone or a gaming device. The screen carried by the portable electronic device may be a touch sensitive screen and the first element touch sensitive surface may be at least a portion of the touch sensitive screen.

In a second aspect of the invention, a user input device is presented and includes a touch sensitive surface arranged to provide a pre-defined desired number of touch sensitive surface areas wherein each of the touch sensitive areas are associated with a corresponding pre-defined functionality. Appropriate control circuitry is responsive to touching contact with the touch sensitive surface for controlling the movement of a cursor in a display graphic such as a graphical user interface (GUI) shown on a screen carried by the electronic device. In a first pre-defined functionality a touching contact with a first pre-defined surface area causes the cursor to move in a corresponding first direction. In a second pre-defined functionality a touching contact with a second pre-defined surface area causes the cursor to move in a corresponding second direction, and in a third pre-defined functionality a touching contact with a third pre-defined surface area causes the cursor to stop movement. The first, second and third pre-defined surface areas are further arranged such that the first pre-defined surface area is juxtaposed and substantially continuous with the third pre-defined surface area and the third pre-defined surface area is juxtaposed and substantially continuous with the second pre-defined surface area. The touch sensitive surface may be resistive, capacitive or inductive touch sensitive surfaces and may be used with portable electronic devices, particularly pocket sized and for handheld use for example gaming devices and mobile cellular telephones.

In a third aspect of the invention, a method is presented and includes the steps of controlling the movement of a cursor in a display graphic using a user input device comprising a touch sensitive surface arranged to provide a number of adjacent touch sensitive surface areas, each of the touch sensitive surface areas being associated with a corresponding cursor movement direction and functionality; touching a touch sensitive surface area; responding to the touching of touch sensitive surface areas, and, moving the cursor in the direction associated with the touch sensitive area being touched. The step of touching may further comprise sliding touching contact in a direction for moving the cursor in a direction corresponding to the direction of the sliding touching contact. The step of moving the cursor may further comprise moving the cursor at an increasing or decreasing speed corresponding to the speed and direction of the sliding touching contact on the corresponding touch sensitive surface area.

In a fourth aspect of the invention, a touch sensitive element for moving a cursor in a graphical user interface (GUI) is presented. A touch sensitive surface is arranged to provide a desired number of adjacent touch sensitive surface areas wherein each of the areas is associated with a corresponding pre-defined cursor movement direction and functionality. Each of the areas are responsive to a touching contact to control the movement of the cursor in accordance with the pre-defined direction and functionality associated with the respective touch sensitive surface areas. The touching contact is a sliding touching contact for moving the cursor in a direction corresponding to the direction of the sliding touching contact and the cursor may move at an increasing or decreasing speed corresponding to the speed and direction of the sliding touching contact on the touch sensitive surface area. The touching contact may also be a tapping touching contact.

In a fifth aspect of the invention, a computer program is presented. The computer program is carried on a storage medium and executable by a processor in an electronic device for controlling the movement of a cursor in a display graphic shown on a screen carried by the electronic device. The electronic device has a user input device comprising a first element having a touch sensitive surface arranged to provide a pre-defined desired number of touch sensitive surface areas wherein each of the touch sensitive areas is associated with a corresponding cursor movement direction and functionality wherein touching contact in a first pre-defined surface area causes the cursor to move in a corresponding first direction, touching contact in a second pre-defined surface area causes the cursor to move in a corresponding second direction, and touching contact in a third pre-defined surface area causes the cursor to stop movement.

BRIEF DESCRIPTION OF THE DRAWINGS

Additional features, objects and advantages of the present invention will become readily apparent from the following written description taken in conjunction with the drawings wherein.

WRITTEN DESCRIPTION OF PREFERRED EMBODIMENTS

Figures 1, 2:
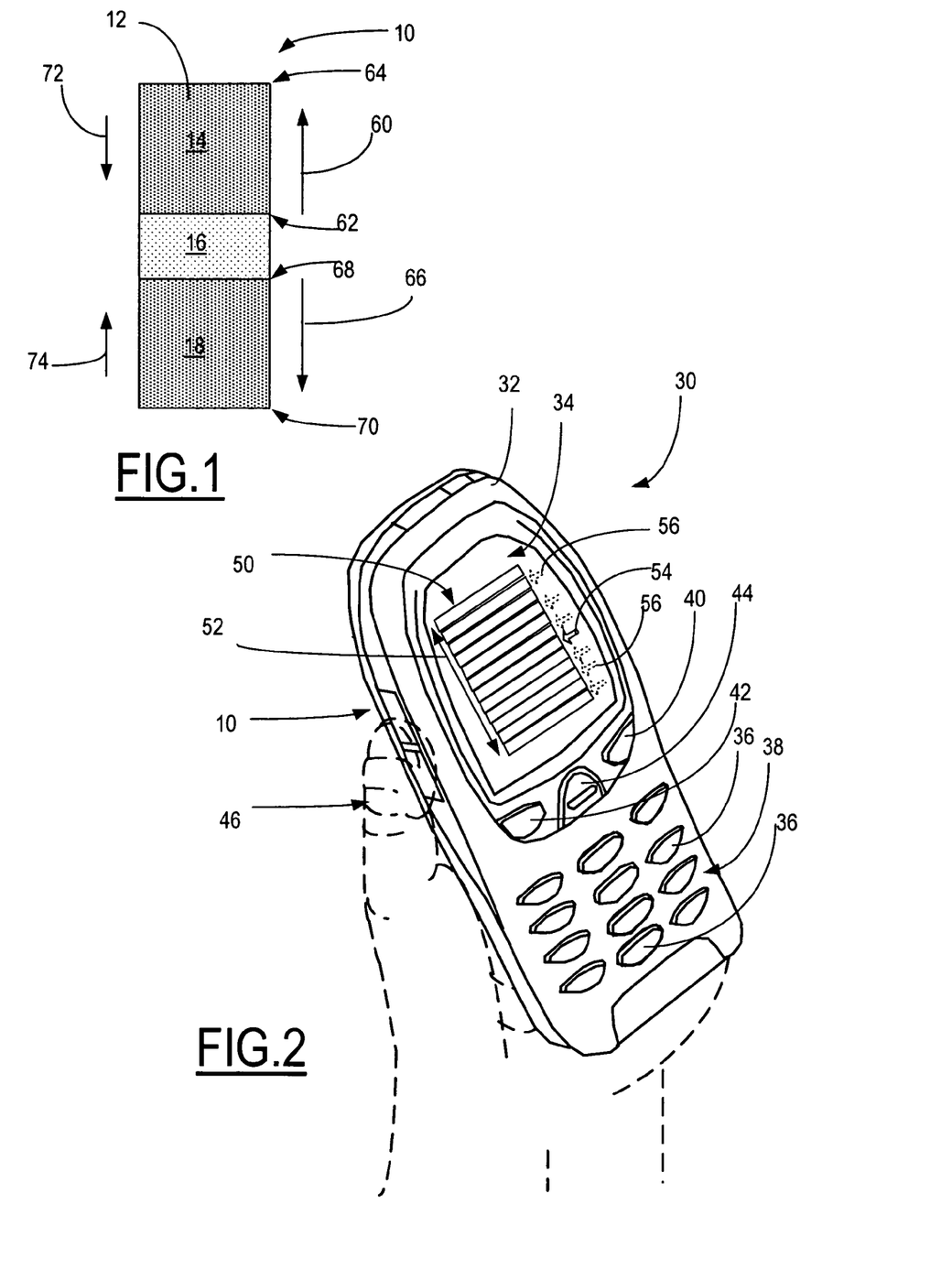
FIG. 1 is a schematic plan view of the touch sensitive user input device embodying the present invention.
FIG. 2 is a schematic perspective view of a portable electronic device with a touch sensitive user input device embodying the present invention.

Turning now to the drawings and considering the invention in further detail, a first embodiment of a touch sensitive element arranged as a touch sensitive user input device is illustrated schematically in FIG. 1 and generally designated 10. The user input device 10 includes a major face surface 12. The surface 12 is a touch sensitive surface and is arranged to provide a desired number of pre-defined touch sensitive surface areas 14, 16, 18 wherein each of the touch sensitive surface areas 14, 16, 18 is associated with a corresponding pre-defined functionality. The touch sensitive surface 12 is of an appropriate material and construction arranged to carry out the intended functions and may be of any well known and understood technology for example, resistive, capacitive, inductive, electro-dielectric mechanical film (EMF), optical array such as a CCD or LED, or other suitable components arranged to map the surface area and respond to a touching contact thereon or in proximity thereto. The user input device embodying the present invention is intended to operate with any suitable sensing medium in addition to mediums which sense and detect a touching contact such as for example proximity sensors wherein the close proximity of a finger or pen stylus activates and carries out the associated corresponding pre-defined functionality associated with that pre-defined area of the touch sensitive surface.

The user input device embodying the present invention may be used with many different devices and controls including but not limited to a mobile device, computer mouse, game controller, touch pad, touch screen, scroll wheel, rotator dial, and is particularly well suited to manipulate on-screen elements in a graphical user interface (GUI). One exemplary embodiment is shown as a schematic perspective view of a portable electronic device such as a mobile cellular telephone generally designated 30 in FIG. 2. The mobile cellular telephone 30 is constructed as having a body 32. The body 32 carries a screen generally designated 34 for displaying text, graphics and other indicia common to mobile cellular telephone devices and well known to users and the general purchasing and user public. The body 32 also includes keys 36, 36 in a desired arrangement defining a keypad 38 to carry out the intended function. Additional keys 40, 42, 44 sometimes referred to as soft keys are provided and are well known and understood to activate the desired associated intended functional operation of the mobile cellular telephone and which functional operations are also well known and understood. The user input device 10 embodying the present invention is conveniently located and carried on the body 32 for ease of use by a user when the mobile cellular telephone 30 is held in the normal manner. As illustrated in FIG. 2 and as further described below, the user input device 10 is conveniently located and operated by the touching contact of the user's thumb which thumb is shown in phantom and generally designated 46. The user input device 10 is electrically connected to the appropriate control circuitry carried in the mobile cellular telephone 30 and is responsive to touching contact with the touch sensitive surface to control the movement of a screen element displayed on the screen 34. The user input device 10 may be located at any convenient portion or area on the electronic device that provides for easy contact and operation with the thumb, finger, stylus or other suitable contact method.

As illustrated in FIG. 2, the screen 34 shows a list or menu generally designated 50 each of which menu items may be associated with a given function of the mobile cellular telephone as activated and selected by one of the keys 40, 42 in a conventional well known manner. Typically, in the prior art the user navigates through the list 50 upward or downward in a direction as indicated by the direction arrow 52 by repeated operation of the key 44 to index a cursor 54 sequentially through the listing of menu items as indicated by the dash line cursor 56 until the desired menu item is reached after which the item is selected and activated in a well known manner. It can be appreciated that the movement of the cursor in this prior art manner is awkward and requires many repetitive steps by the user. The touch sensitive element arranged as the user input device 10 embodying the present invention as explained above and in further detail below substantially reduces or eliminates repetitive and awkward movements of prior art devices.

Still referring to FIGS. 1 and 2, the user input device 10 is described as it might be used in the scrolling function for the mobile cellular telephone 30. In this instance, the user desires to scroll the cursor 54 upward and downward through the menu list 50 as indicated by the direction arrow 52. To move the cursor 54 in the upward direction toward the top of the menu list the user taps the surface 14 with the thumb 46 with each successive touching contact moving the cursor a fixed incremental distance upward as indicated by the dash line cursor 56 until the cursor reaches or is positioned opposite the desired menu item or otherwise highlights the menu item. If the user wishes to move the cursor downward through the menu list 50, the thumb 46 is tapped against the surface 18 to move the cursor downward each time the cursor is tapped by the thumb to reach and stop at the desired menu item. In this instance, the user input device 10 functions in a similar manner as a key or a rocker switch moving the cursor each time the switch is operated.

The velocity or speed of the cursor movement in the upward direction through the menu list 50 can be increased by a sliding touching contact of the thumb or finger along the surface 14 in the direction indicated by the direction arrow 60 from one end 62 to the upper end 64 of the surface 14 with the velocity of the cursor movement being the lowest at the end 62 and the maximum at the end 64. Likewise, the cursor velocity in the downward direction can be controlled by a sliding or touching contact of the thumb or finger along the surface 18 in the direction as indicated by the direction arrow 66 from the end 68 to the end 70 with the lowest velocity being at the end 68 and the maximum velocity being at the end 70. In this feature, the user input device functions in a similar manner as a slider switch moving the cursor according to the position of the slider along the travel path.

The user input device may also be configured to provide movement of the cursor without continually tapping the touch sensitive surface areas but rather by imparting momentum to the cursor to move in the desired direction by a sliding touching contact of the thumb or finger along the surface 14 in the direction indicated by the direction arrow 60. The velocity of the cursor 54 can be slowed by a sliding touching contact of the thumb or finger in the direction indicated by the direction arrow 72 wherein the velocity of the cursor is proportional to the velocity or speed of movement of the thumb 46 along the surface 14. Likewise, the velocity or speed of the cursor 54 can be increased or decreased in proportion to the sliding touching contact velocity of the thumb 46 along the surface 18 in the direction indicated by the direction arrow 66 to increase the speed and in the direction indicated by the direction arrow 74 to decrease the cursor speed.

Figure 3:
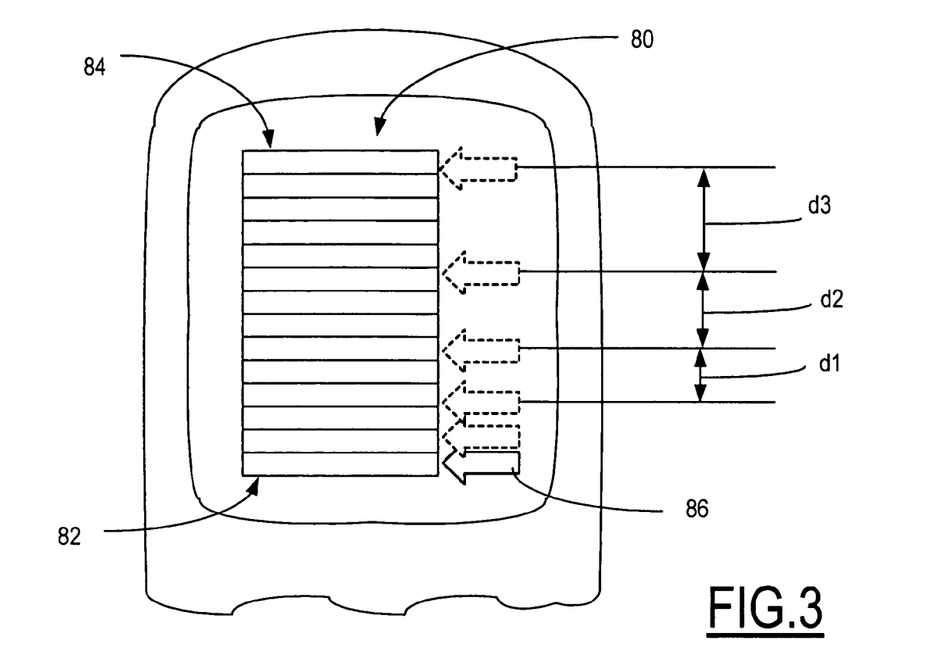
FIG. 3 is a schematic diagram showing a corresponding cursor movement representative of an increasing speed in response to a user sliding touching contact with a pre-defined surface of the touch sensitive user input device.
Figure 4:
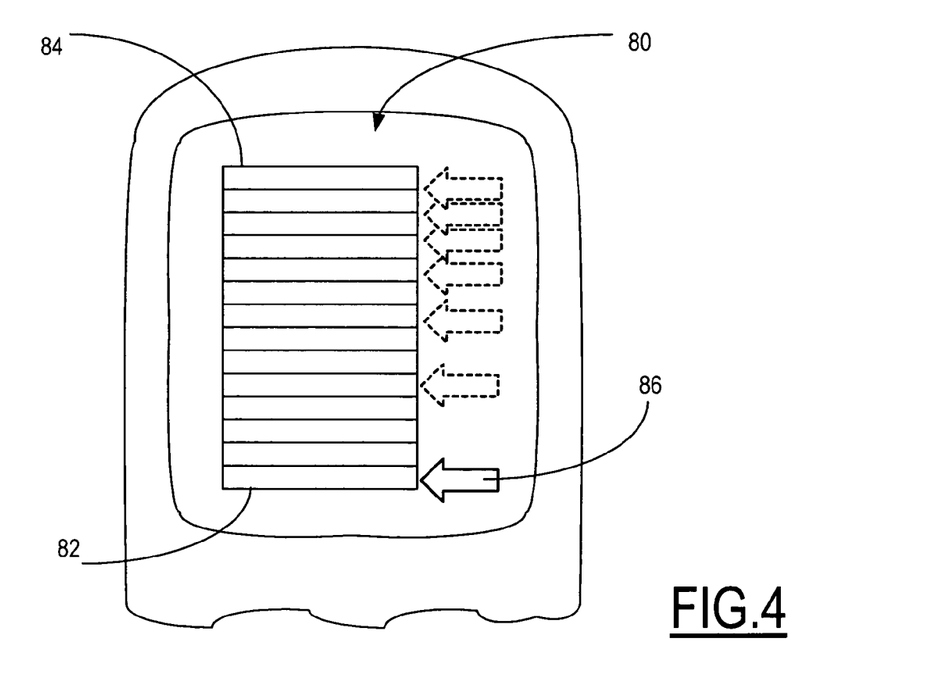
FIG. 4 is a schematic diagram showing a corresponding cursor movement representative of a decreasing speed in response to a user sliding touching contact with a pre-defined surface of the touch sensitive user input device.

FIG. 3 illustrates schematically an increasing cursor speed or velocity through the menu list 80 from the bottom 82 to the top 84 wherein the cursor 86 moves with increasing incremental displacement per unit time. In the illustration in FIG. 3, the cursor displacement from bottom to top is shown as an increasing displacement d1 which displacement d1 is less than the displacement d2 which displacement d2 is in turn less than the displacement d3. In other words, the cursor moves through more menu items per unit time as the velocity increases. FIG. 4 illustrates schematically a decreasing cursor velocity as the cursor 86 moves from the bottom 82 to the top 84 of the list 80 wherein the cursor movement is represented by the dashed lines which are shown closer together toward the top 84 of the menu list 80 indicating a slower velocity as the displacement per unit time decreases.

The acceleration or deceleration of the cursor 86 through the menu list 80 can also be controlled by utilizing a pressure sensor touch sensitive surface in the user input device wherein the velocity of the cursor is proportional to the pressure applied to the pressure sensor touch sensitive surface with a higher pressure resulting in an increased cursor velocity. Alternately, the velocity of the cursor may be increased in proportion to the time that a force is applied to the pressure sensor touch sensitive surface with a higher cursor velocity corresponding to the force being applied for a longer time. In other words, the velocity of the cursor is proportional to the pressure and/or the time that the pressure sensor touch sensitive surface is contacted by the user. Typical pressure sensor touch sensitive surfaces are capacitive touch sensitive sensors and are well known to those skilled in the art.

In a further embodiment, the upper limit of the velocity of the cursor is reset each time the user slides his/her thumb along the touch sensitive surface as described above such that successive sliding contact increases the speed of the cursor and which increases in cursor speed may be either additive or multiplicative in accordance with the desired intended result through use of appropriate control circuitry within the mobile cellular telephone 30. The user may stop the cursor movement at any time by contacting the touch sensitive surface area 16.

Figure 5:
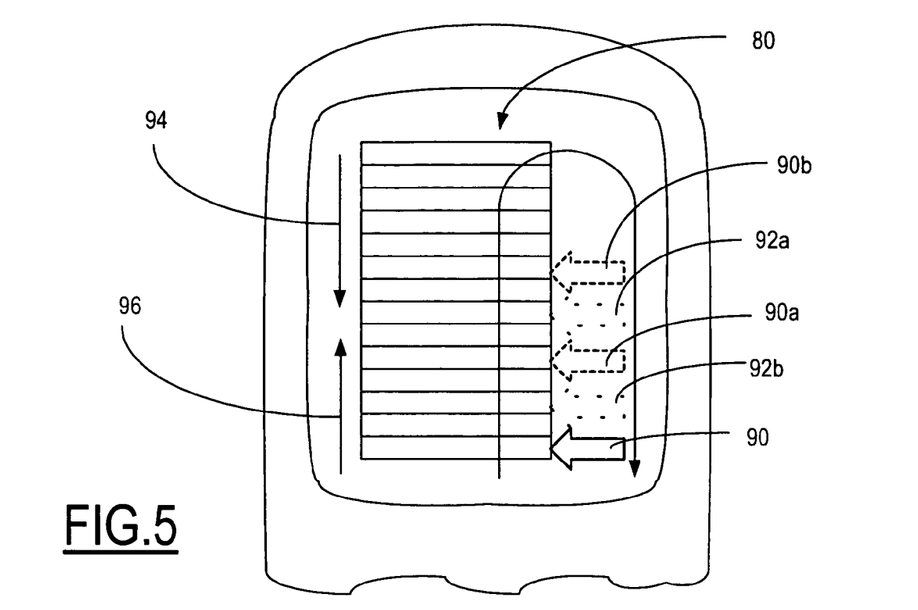
FIG. 5 is a schematic diagram showing a corresponding cursor movement change of direction in response to a user sliding touching contact through a pre-defined stop zone in the surface of the touch sensitive user input device.

Turning to FIG. 5 and still considering FIGS. 1 and 2, a user may change the direction of movement of the cursor 90 moving through a menu list 80 wherein as shown in the illustrated example the cursor 90 moves in an upward direction indicated by the direction arrow 96 in response to the user contacting the surface 14 causing the cursor to move upward as represented by the dash line cursor 90a and 90b. The user causes the direction of cursor movement to change by contacting the surface area 16 and then coming into contact with the surface area 18 thereby causing the cursor to move downward through the menu item list in the direction as indicated by the direction arrow 94 as represented by the movement of the dash line cursor 92a and 92b. The user input device 10 may further be configured such that the surface area 16, in addition to providing a stop functionality, may be arranged to operate as a select mode functionality when the cursor movement is stopped for example to select an item in the menu list corresponding to the location or position of the stopped cursor and to activate the particular function associated with the menu item when contact is made with the surface area 16.

Figure 6:
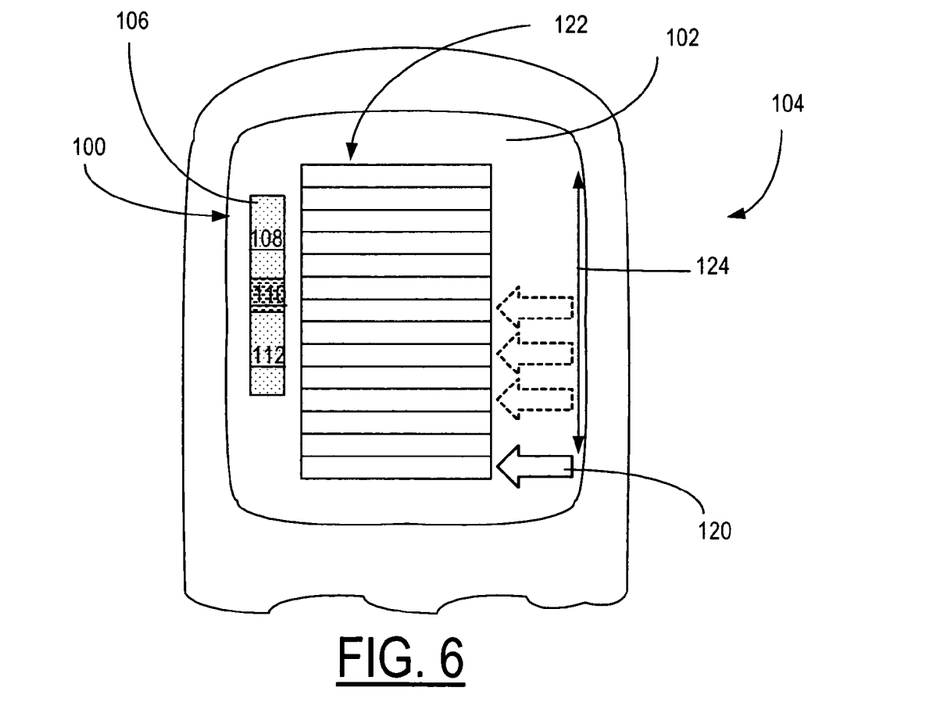
FIG. 6 is a schematic plan view of the touch sensitive user input device in an alternate embodiment showing the user input device as part of a touch sensitive display screen in a portable electronic device.

Turning to FIG. 6, a schematic plan view of the touch sensitive user input device embodying the present invention is illustrated in an alternate embodiment wherein the user input device generally designated 100 is shown as part of a touch sensitive display screen 102 in a portable electronic device such a mobile cellular telephone generally designated 104. The user input device 100 includes a touch sensitive surface 106 arranged to provide a number of pre-defined touch sensitive surface areas 108, 110, 112 with each surface area being associated with a corresponding pre-defined functionality. The user input device 100 is electrically connected to appropriate control circuitry carried within the mobile cellular telephone and is responsive to touching contact with the touch sensitive surface 106 to control the movement of a cursor 120 in a graphical user interface (GUI) such as the menu list 122 shown on the screen 102. Movement of the cursor 120 upward and downward through the menu list 122 as indicated by the direction arrow 124 is controlled by a user tapping, sliding or being in proximity to each of the respective surface areas 108, 110, 112 to control the cursor movement in a similar manner as described above.

Figure 7:
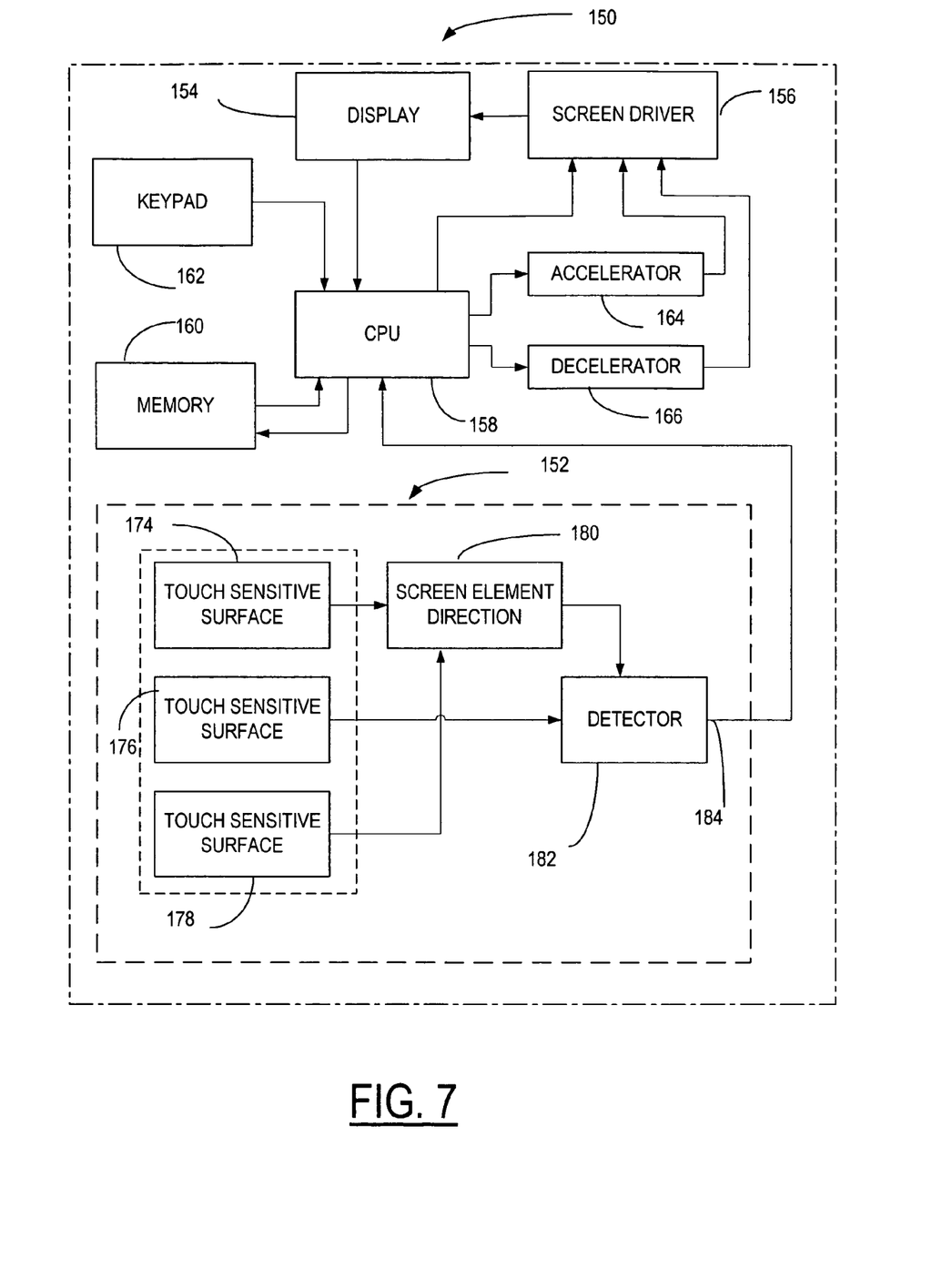
FIG. 7 is a schematic functional block diagram of a portable electronic device embodying the touch sensitive user input device of the present invention.

Turning now to FIG. 7, a schematic functional block diagram of a portable electronic device embodying the touch sensitive user input device of the present invention is illustrated therein and generally designated 150 wherein the user input device is shown within the dashed line box and generally indicated 152. The portable electronic device illustrated includes a display 154 and a screen driver 156 for controlling the text, graphics or other indicia shown on the display 154. A CPU 158 controls the functional operations of the portable electronic device 150 in accordance with an instruction set such as a computer program carried on a storage medium or carried in a memory 160 and executable by the CPU to carry out the intended selected functions and control movement of the cursor in a graphical user interface with a touch sensitive element or touch sensitive user input device as described herein. A keypad 162 is used to input text, commands or other necessary user input to operate the portable electronic device. The user input device 152 includes touch sensitive surfaces 174, 176 and 178 respectively and are responsive to touching the contact to provide an input signal to move the on-screen element in a desired direction and with a desired velocity. The desired on-screen element movement direction is sensed by the function block 180 connected to the touch sensitive surface 174 and the touch sensitive surface 178 to provide an input signal to the detector as illustrated by the function block 182 indicating the direction and desired velocity of the screen element. The touch sensitive surface 176 is likewise connected to the detector function block 182 to provide a halting or stop signal for the on-screen element to the detector function block 182. The detector block 182 provides its output 184 to the CPU 158 which processes the information in such a manner to provide the appropriate signals to the screen driver 156 and to the accelerator function block 164 and decelerator function block 166 as required to control the direction and velocity of the on-screen element shown and the display 154.

The invention claimed:

1. An electronic device comprising:
a user input device comprising:
a touch sensitive surface arranged in and forming a part of a surface of the electronic device and being arranged to provide a desired number of pre-defined touch sensitive surface areas each of said touch sensitive surface areas being associated with a respective corresponding pre-defined functionality;
appropriate control circuitry responsive to a touching contact with a said touch sensitive surface area configured to control the velocity and direction of movement of a cursor in a display graphic shown on a screen carried by the electronic device wherein:
a first pre-defined touch sensitive surface area comprises a first pre-defined functionality configured to cause the cursor to move in a corresponding first direction in response to a sliding motion touching contact with said first pre-defined touch sensitive surface area in a first direction on said first pre-defined touch sensitive surface area to accelerate the cursor movement in said corresponding first direction and in a second direction opposite said first direction on said first pre-defined touch sensitive surface area to decelerate the cursor movement in said corresponding first direction;
a second pre-defined touch sensitive surface area comprises a second pre-defined functionality configured to cause the cursor to move in a corresponding second direction in response to a sliding motion touching contact with said second pre-defined touch sensitive surface area in a first direction on said second pre-defined touch sensitive surface area to accelerate the cursor movement in said corresponding second direction and in a second direction on said second pre-defined touch sensitive surface area for decelerating the cursor movement in said corresponding second direction; and
a third pre-defined touch sensitive surface area comprises a third pre-defined functionality configured to cause the cursor to stop movement in response to a touching contact with said third pre-defined touch sensitive surface area.

2. The electronic device as defined in claim 1 further comprising said first, second and third pre-defined touch sensitive surface areas being arranged such that said first pre-defined touch sensitive surface area is juxtaposed and substantially continuous with said third pre-defined touch sensitive surface area and said third pre-defined touch sensitive surface area is juxtaposed and substantially continuous with said second pre-defined touch sensitive surface area.

3. The electronic device as defined in claim 1 wherein the direction of said cursor movement in said corresponding first direction is opposite to the direction of said cursor movement in said corresponding second direction.

4. The electronic device as defined in claim 1 wherein a touching contact with said third pre-defined touch sensitive surface area activates a corresponding operation identified at a given cursor location in the display graphic.

5. The electronic device as defined in claim 1 wherein the electronic device is portable and pocket sized and for handheld usage.

6. The electronic device is defined in claim 5 wherein the electronic device is a mobile cellular telephone.

7. The electronic device as defined in claim 5 wherein the electronic device is a gaming device.

8. The electronic device as defined in claim 1 wherein said screen carried by said portable electronic device is a touch sensitive screen and said touch sensitive surface comprises at least a portion of said touch sensitive screen.

9. A user input device comprising:
a touch sensitive surface arranged in and forming a part of a surface, said touch sensitive surface being arranged to provide a desired number of pre-defined touch sensitive surface areas each of said touch sensitive areas being associated with a respective corresponding pre-defined functionality;
appropriate control circuitry responsive to touching contact with said touch sensitive surface configured to control the velocity and direction of movement of a cursor in a display graphic wherein:
a first pre-defined touch sensitive surface area comprises a first pre-defined functionality configured to cause the cursor to move in a corresponding first direction in response to a continuous pressing touching contact with said first pre-defined touch sensitive surface area and to respond to a sliding motion touching contact in a first direction on said first pre-defined touch sensitive surface area to accelerate the cursor movement in said corresponding first direction and to respond to a sliding motion touching contact in a second direction opposite said first direction with said first pre-defined touch sensitive surface area to decelerate the cursor movement in said corresponding first direction;
a second pre-defined touch sensitive surface area comprises a second pre-defined functionality configured to cause the cursor to move in a corresponding second direction in response to a continuous pressing touching contact with said second pre-defined touch sensitive surface area and to respond to a sliding motion touching contact in a first direction with said second pre-defined touch sensitive surface area to accelerate the cursor movement in said corresponding second direction and to respond to a sliding motion touching contact in a second direction with said second pre-defined touch sensitive surface area to decelerate the cursor movement in said corresponding second direction; and
a third pre-defined touch sensitive surface area comprises a third pre-defined functionality configured to cause the cursor to stop movement in response to a touching contact with said third pre-defined touch sensitive surface area;
said first and said second touch sensitive surface further configured to respond to said continuous pressing touching contact such that the velocity of the cursor is proportional to the pressure force applied to said first and said second touch sensitive surface area.

10. The user input device as defined in claim 9 further comprising said first, second and third pre-defined touch sensitive surface areas being arranged such that said first pre-defined touch sensitive surface area is juxtaposed and substantially continuous with said third pre-defined touch sensitive surface area and said third pre-defined touch sensitive surface area is juxtaposed and substantially continuous with said second pre-defined touch sensitive surface area.

11. The user input device as defined in claim 9 wherein said cursor movement in said corresponding first direction is in a direction opposite to said cursor movement in said corresponding second direction.

12. The user input device as defined in claim 9 wherein the cursor is arranged to move a first pre-defined desired distance in said corresponding first direction in response to a touching contact with said first pre-defined touch sensitive surface area and a second pre-defined desired distance in said corresponding second direction in response to a touching contact with said second pre-defined touch sensitive surface area.

13. The user input device as defined in claim 12 wherein the cursor is arranged to move said respective first and second pre-defined desired distance in response to each time said touching contact is made with said respective first pre-defined touch sensitive surface area and said second pre-defined touch sensitive surface area.

14. The user input device as defined in claim 9 further configured to move the cursor moves until said continuous pressing contact is removed from said touch sensitive surface.

15. The user input device as defined in claim 9 further configured to activate a corresponding operation identified at a given cursor location in the display graphic in response to a touching contact with said third pre-defined touch sensitive surface area.

16. The user input device as defined in claim 9 further arranged for use with a portable electronic device wherein the portable electronic device is pocket sized and for handheld use.

17. The user input device as defined in claim 9 further arranged for use with a portable electronic device wherein the portable electronic device is a gaming device.

18. The user input device as defined in claim 9 further arranged for use with a portable electronic device wherein the portable electronic device is a mobile cellular telephone.

19. The user input device as defined in claim 9 wherein said first element touch sensitive surface is a resistive touch sensitive surface.

20. The user input device as defined in claim 9 wherein said first element touch sensitive surface is a capacitive touch sensitive surface.

21. The user input device as defined in claim 9 wherein said first element touch sensitive surface is an inductive touch sensitive surface.

22. The user input device as defined in claim 9 further configured to cause the cursor to move with an increasing speed proportional to the speed of the sliding motion touching contact along said touch sensitive surface area.

23. The user input device as defined in claim 22 wherein said touch sensitive surface is configured to respond to successive sliding motion touching contact to move the cursor correspondingly faster with each successive sliding motion touching contact on said touch sensitive surface.

24. The user input device as defined in claim 9 further configured to increase the velocity of the cursor in response to a higher pressure force applied to said touch sensitive surface area.

25. The user input device as defined in claim 9 further configured to decrease the velocity of the cursor in response to a lower pressure force applied to said touch sensitive surface area.

26. Method, comprising:
controlling the velocity and direction of movement of a cursor in a display graphic using a user input device comprising a touch sensitive surface arranged in and forming a part of a surface and arranged to provide a desired number of pre-defined touch sensitive surface areas, each of said touch sensitive surface areas being associated with a respective corresponding cursor movement direction and functionality;
touching a one or more of said touch sensitive surface areas;
responding to the touching of said touch sensitive surface areas to control the velocity and direction of the cursor, and
moving the cursor in a corresponding first direction in response to a touching contact with a first pre-defined touch sensitive surface area,
moving the cursor in a corresponding second direction in response to a touching contact with a second pre-defined touch sensitive surface area,
stopping the cursor movement in response to a touching contact with a third pre-defined touch sensitive surface area, and
activating a corresponding operation at a given cursor location in the display graphic in response to a touching contact with said third pre-defined touch sensitive surface area.

27. The method as defined in claim 26 further comprising a sliding motion touching contact in a direction to move the cursor in a direction corresponding to the direction of the sliding motion touching contact.

28. The method as defined in claim 26 further comprising moving the cursor at an increasing speed or a decreasing speed corresponding to the speed and direction of the sliding motion touching contact on the corresponding pre-defined touch sensitive surface area.

29. A touch sensitive element for moving a cursor in a graphical user interface (GUI), comprising:
a touch sensitive surface arranged in and forming a part of a surface of the graphical user interface and arranged to provide a desired number of adjacent pre-defined touch sensitive surface areas, each of said pre-defined touch sensitive surface areas being associated with a corresponding pre-defined cursor movement direction and functionality, each of said pre-defined touch sensitive surface areas configured to be responsive to a touching contact to control the velocity and direction of movement of the cursor in accordance with the pre-defined direction and functionality associated with each of said respective pre-defined touch sensitive surface areas and one of said pre-defined touch sensitive surface areas further configured to stop the cursor movement in response to a touching contact and to activate a corresponding operation identified at a given location in the graphic user interface.

30. The touch sensitive element as defined in claim 29 further configured to move the cursor in a direction corresponding to the direction of a sliding motion touching contact with a said pre-defined touch sensitive surface area.

31. The touch sensitive element as defined in claim 30 further configured to move the cursor at an increasing or a decreasing speed corresponding to the speed and direction of the sliding motion touching contact on a said pre-defined touch sensitive surface area.

32. The touch sensitive element as defined in claim 29 wherein said touching contact is a tapping touching contact.

33. Computer program carried on a computer readable storage medium and executable by a processor in an electronic device for controlling the velocity and direction of movement of a cursor in a display graphic shown on a screen carried by the electronic device having a user input device comprising a touch sensitive surface arranged in and forming a pat of a surface of the electronic device and arranged to provide a pre-defined desired number of touch sensitive surface areas each of said touch sensitive areas being associated with a respective corresponding cursor movement direction and functionality wherein touching contact in a first pre-defined touch sensitive surface area causes the cursor to move in a corresponding first direction, touching contact in a second pre-defined touch sensitive surface area causes the cursor to move in a corresponding second direction, and touching contact in a third pre-defined touch sensitive surface area causes the cursor to stop movement and to activate a corresponding operation identified at a given cursor location on the display graphic.

34. An electronic device comprising:
a user input device comprising:
a touch sensitive surface being arranged to provide a desired number of pre-defined touch sensitive surface areas each of said touch sensitive areas being associated with a respective corresponding pre-defined functionality;
appropriate control circuitry responsive to a touching contact with said touch sensitive surface for controlling the velocity and direction of movement of a cursor in a display graphic shown on a screen carried by the electronic device wherein:
a first pre-defined touch sensitive surface area comprises a first pre-defined functionality configured to cause the cursor to move in a corresponding first direction in response to a touching contact with said first pre-defined touch sensitive surface area;
a second pre-defined touch sensitive surface area comprises a second pre-defined functionality configured to cause the cursor to move in a corresponding second direction in response to a touching contact with said second pre-defined touch sensitive surface area; and
a third pre-defined touch sensitive surface area comprises a third pre-defined functionality configured to cause the cursor to stop movement in response to a touching contact with said third pre-defined touch sensitive surface area and to activate a corresponding operation identified at a given cursor location in the display graphic.

35. The electronic device as defined in claim 34 wherein said touching contact further comprises a tapping touching contact on said touch sensitive surface for moving the cursor a first pre-defined desired distance in said corresponding first direction in response to a tapping touching contact on said first pre-defined touch sensitive surface area and a second pre-defined desired distance in said corresponding second direction in response to a tapping touching contact with said second pre-defined touch sensitive surface area.

36. The electronic device as defined in claim 35 wherein the cursor is arranged to move in said respective first and second pre-defined desired distance in response to each time said tapping touching contact is made on said respective first pre-defined touch sensitive surface area and said second pre-defined touch sensitive surface area.

37. The electronic device as defined in claim 34 wherein said touch sensitive surface is configured to respond to a continuous pressing touching contact such that the velocity of the cursor is proportional to the pressure force applied to the touch sensitive surface area.

38. The electronic device as defined in claim 37 further configured to move the cursor until said continuous pressing touching contact is removed from said touch sensitive surface.

39. The electronic device as defined in claim 37 further configured to increase the velocity of the cursor in response to a higher pressure force applied to the touch sensitive surface area.

40. The electronic device as defined in claim 34 wherein said touching contact further comprises a continuous pressing touching contact against said touch sensitive surface and configured to cause the velocity of the cursor to be proportional to the time the pressing touching contact is applied to the touch sensitive surface area.

41. The electronic device as defined in claim 40 further configured to increase the velocity of the cursor in response to the pressing touching contact being applied to the touch sensitive surface area for a longer time duration.

42. A user input device comprising:

a touch sensitive surface, said touch sensitive surface being arranged to provide a desired number of pre-defined touch sensitive surface areas each of said touch sensitive areas being associated with a respective corresponding pre-defined functionality;

appropriate control circuitry responsive to touching contact with said touch sensitive surface for controlling the velocity and direction of movement of a cursor in a display graphic wherein:

a first pre-defined touch sensitive surface area comprises a first pre-defined functionality configured to cause the cursor to move in a corresponding first direction in response to a touching contact with said first pre-defined touch sensitive surface area;

a second pre-defined touch sensitive surface area comprises a second pre-defined functionality configured to cause the cursor to move in a corresponding second direction in response to a touching contact with said second pre-defined touch sensitive surface area; and a third pre-defined touch sensitive surface area comprises a third pre-defined functionality configured to cause the cursor to stop movement in response to a touching contact with said third pre-defined touch sensitive surface area and to activate a corresponding operation identified at a given cursor location in the display graphic;

said touch sensitive surface is further configured to respond to a continuous pressing touching contact such that the velocity of the cursor is proportional to the pressure force applied to the touch sensitive surface area.

\* \* \* \* \*